(12) United States Patent
Connell (10) Patent No.: US 7,970,229 B2
(45) Date of Patent: Jun. 28, 2011

(54) METHOD AND APPARATUS FOR VISUAL BACKGROUND SUBTRACTION WITH ONE OR MORE PREPROCESSING MODULES

(75) Inventor: Jonathan H. Connell, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 346 days.

(21) Appl. No.: 12/127,952

(22) Filed: May 28, 2008

(65) Prior Publication Data

US 2008/0226189 A1   Sep. 18, 2008

Related U.S. Application Data

(63) Continuation of application No. 11/216,667, filed on Aug. 31, 2005, now abandoned.

(51) Int. Cl.
*G06K 9/40* (2006.01)

(52) U.S. Cl. ........ 382/254; 348/143; 348/578; 382/103; 382/199; 382/203

(58) Field of Classification Search .................. 348/143, 348/152, 169; 382/190, 203, 254, 256, 266, 382/274, 275
See application file for complete search history.

(56) References Cited

U.S. PATENT DOCUMENTS

| | | | | |
|---|---|---|---|---|
| 6,108,457 | A * | 8/2000 | Nevis | 382/274 |
| 6,118,886 | A * | 9/2000 | Baumgart et al. | 382/103 |
| 7,227,893 | B1 * | 6/2007 | Srinivasa et al. | 375/240.08 |
| 7,372,994 | B2 * | 5/2008 | Hagio | 382/199 |
| 7,382,896 | B2 * | 6/2008 | Ito et al. | 382/103 |
| 7,720,257 | B2 * | 5/2010 | Morellas et al. | 382/103 |
| 7,831,087 | B2 * | 11/2010 | Harville | 382/154 |
| 2002/0034337 | A1 * | 3/2002 | Shekter | 382/275 |
| 2003/0086018 | A1 * | 5/2003 | Berman et al. | 348/584 |
| 2004/0131254 | A1 * | 7/2004 | Liang et al. | 382/181 |
| 2005/0276515 | A1 * | 12/2005 | Shekter | 382/286 |
| 2006/0023090 | A1 * | 2/2006 | Takata et al. | 348/239 |

OTHER PUBLICATIONS

Boult et al., "Into the Woods: Visual Surveillance of Non-Cooperative and Camouflaged Targets in Complex Outdoor Settings," Proceedings of the IEEE (Oct. 2001).

Stauffer, C., "Adaptive Background Mixture Models for Real-Time Tracking," Proceedings IEEE Conf on Computer Vision and Pattern Recognition, pp. 246-252 (1999).

Javed et al., "A Hierarchical Approach to Robust Background Substraction Using Color and Gradient Information," IEEE Workshop on Motion and Video Computing (Dec. 5-6, 2002).

* cited by examiner

*Primary Examiner* — Gregory M Desire
(74) *Attorney, Agent, or Firm* — Ryan, Mason & Lewis, LLP (57) ABSTRACT

Methods and apparatus are provided for visual background subtraction using one or more preprocessing modules. One or more effects are detected in a received image signal and one or more blocks are selectively enabled to preprocess the image signal to compensate for the detected one or more effects. Visual analysis is then performed on the preprocessed signal using background subtraction. A spatially-variant temporal smoothing of the image signal is also disclosed. The spatially-variant temporal smoothing can be achieved by the mixing of a new intensity value with a previous intensity time-average as determined by a weighting matrix. The mixing can be influenced by a dynamic bias term that is a real-time estimate of a variance at the pixel, such as a degree of change, and the weighting can be determined by a relative stability of an observed value compared to a stability of the time-average.

24 Claims, 5 Drawing Sheets

METHOD AND APPARATUS FOR VISUAL BACKGROUND SUBTRACTION WITH ONE OR MORE PREPROCESSING MODULES

CROSS-REFERENCE TO RELATED APPLICATIONS

This application is a continuation of U.S. patent application Ser. No. 11/216,667, filed Aug. 31, 2005, now abandoned incorporated by reference herein.

FIELD OF THE INVENTION

The present invention relates generally to imaging processing techniques, and, more particularly, to techniques for visual background subtraction.

BACKGROUND OF THE INVENTION

Background subtraction is a popular technology for finding moving objects in images of an environment. Unfortunately, there are numerous factors that can adversely impact the efficacy of this class of techniques. Such disturbances include changes in camera responses due to automatic gain and color-balance corrections, image jitter due to vibration or wind, perceptually-masked artifacts due to video compression or cabling inadequacies, and varying object size due to lens distortion or imaging angle.

Some of these problems have simple solutions, but they are not optimal. While video can be transmitted and recorded in an uncompressed state, the required bandwidth and disk-storage space increases costs significantly. Similarly, lens distortions can be remedied by purchasing better (albeit more expensive) optics. Although it is possible to correct imaging geometry, this is difficult to cope with in practice because it involves moving cameras to optimal viewing locations. Such locations may be inconvenient (e. g., requiring significantly longer cable runs) or not feasible (e.g., above the ceiling level).

The solutions to other problems are not as straightforward. When the camera shakes due to wind or other vibration, for example, the current image acquired by the camera will not exactly line-up with a previously captured reference image. This leads to detection of image changes (particularly near edges or in textured regions) that are not due to independent objects. Stabilizing the images produced by such surveillance cameras eliminates these artificial detections.

Stabilization can be accomplished by mechanically moving the camera in response to inertial measurements, or by altering portions of the optical path (e.g., sliding prisms) in response to similar error signals. However these solutions require changing the cameras that are already installed. Also, these solutions are typically bulkier than an ordinary fixed camera and hence may be difficult to install in some locations. Stabilization may also be performed electronically (as in some camcorders) by shifting the pixel read positions on a digital image sensor. However, these pixel shifts are typically integer pixel shifts that are not accurate enough to remove all the artifacts generated by background subtraction. Another option is to use image warping based on optical flow analysis. However, this analysis is mathematically complicated thus necessitating either a lower video frame rate or a more expensive computation engine.

Many cameras have built-in circuitry or algorithms for automatic gain control (AGC) and automatic white balance (AWB). These mechanisms typically generate video images that are more pleasing to the human eye. Unfortunately, these corrections can impair machine analysis of the images because there are frame to frame variations that are not due to any true variation in the imaged environment. Background subtraction is particularly affected by this phenomenon that can cause large portions of the image to be falsely declared as foreground. Some cameras allow AGC and AWB to be disabled, however, this may not be true for all (possibly legacy) cameras in a video surveillance system. Also, it is sometimes desired to analyze previously recorded material where the source camera and its parameters can not be controlled retroactively. While it is possible to correct exposure and color balance using techniques such as histogram stretching or contrast stretching, these whole-image methods can be confused if the content of the scene changes.

Furthermore, when using legacy analog video transmission format RS-170, the color of a pixel is encoded as a phase-shifted chrominance signal riding on top of the standard amplitude modulated intensity signal. Unfortunately, when separating these two signals to reconstruct the image representation, sharp changes in the intensity signal can be interpreted as color shifts. This can happen due to inadequate band limiting of the intensity signal at the source, poor "comb" filtering at the receiver, or nonlinear dispersion in the transmission medium (typically coax cable). This aliasing results in strobing color rainbow patterns around sharp edges. This can be disadvantageous for computer vision systems that need to know the true colors of regions, or for object detection and tracking systems based on background subtraction which may erroneously interpret these color fluctuations as moving objects.

The impact of these color artifacts can be diminished by converting the image to monochrome (i.e., a black and white image) so that there are no color shifts, only smaller intensity variations. However, this processing removes potentially valuable information from the image. For instance, in a surveillance system it is useful to be able to discern the colors of different vehicles, something not possible in a gray-scale video. Another approach is to apply aggressive spatial smoothing to the image so that the "proper" adjacent colors dominate in the problem areas. However, this approach is sub-optimal in that the boundaries of objects (and sometimes even their identities) can be obscured by such blurring. Still another method would be to attempt to reconstruct the original two-part analog signal and then employ a more sophisticated chrominance-luminance separation filter. Unfortunately, many times video has been subject to a lossy compression method, such as MPEG (especially if it has been digitally recorded), in which case the exact details of the original waveform cannot be recovered with sufficient fidelity to permit this re-processing.

A further problem is that video images often contain "noise" that is annoying to humans and can be even more detrimental to automated analysis systems. This noise comes primarily from three sources: imager noise (e.g., pixel variations), channel noise (e.g., interference in cabling), and compression noise (e.g., MPEG "mosquitoes"). Effective removal or suppression of these types of noise leads to more pleasing visuals and more accurate computer vision systems. One standard method for noise removal is spatial blurring, which replaces a pixel by a weighted sum of its neighbors. Unfortunately, this tends to wash out sharp edges and obscure region textures. Median-based filtering attempts to preserve sharp edges, but still corrupts texture (which is interpreted as noise) and leads to artificially "flat" looking images. Another method, temporal smoothing, uses a weighted sum of pixels from multiple frames over time. This works well for largely stationary images, but moving objects often appear ghostly and leave trails behind.

Yet another difficulty is that background subtraction operates by comparing the current image with a reference image and highlights any pixel changes. Unfortunately, while often the desired result is the delineation of a number of physical objects, shadow legions are typically also marked because the scene looks different here as well. Eliminating or suppressing shadow artifacts is desirable because it allows better tracking and classification of a detected object (i.e., its forms varies less over time and does not depend on lighting conditions).

One way to eliminate shadows is to first perform basic background subtraction and then to more closely examine the pixels flagged as foreground. For example, the hue, saturation, and intensity can be computed separately from the foreground pixel and the corresponding background pixel. If the hue and saturation measures are a close match, the intensities are then examined to see if they are within a plausible range of variations. If so, the pixel is declared a shadow artifact and removed from the computed foreground mask. Unfortunately, this method requires the computation of hue, which is typically expensive because it involves trigonometric operators. Moreover, hue is unstable in regions of low saturation or intensity (e.g., shadows). Finally, the derived hue is very sensitive to the noise in each color channel (the more noise, the less reliable the estimate).

A need therefore exists for improved techniques for visual background subtraction. A further need exists for methods and apparatus for visual background subtraction that address each of the above-identified problems using one or more software preprocessing modules.

SUMMARY OF THE INVENTION

Generally, methods and apparatus are provided for visual background subtraction using one or more preprocessing modules. According to one aspect of the invention, an image signal that has undergone previous corruption by one or more effects is processed. The one or more effects in the received image signal are detected and one or more blocks are selectively enabled to preprocess the image signal to compensate for the detected one or more effects. Thereafter, visual analysis, such as identifying one or more objects in the preprocessed image signal, is performed on the preprocessed signal using background subtraction.

The one or more blocks may selectively perform one or more of a jitter correction on the image signal, a color correction on the image signal, a contrast enhancement on the image signal, a cable-induced visual artifact reduction on the image signal, a spatially-variant temporal smoothing on the image signal, and a lens geometry normalization on the image signal.

According to another aspect of the invention, a spatially-variant temporal smoothing is performed on the image signal. Thereafter, the processed image is presented for visual analysis. The spatially-variant temporal smoothing can be achieved by the mixing of a new intensity value with a previous intensity time-average as determined by a weighting matrix. The mixing can be influenced by a dynamic bias term that is a real-time estimate of a variance at the pixel. The weighting can be determined by a relative stability of an observed value compared to a stability of the time-average and an amount of the mixing is based on a degree of change observed at the pixel. The spatially-variant temporal smoothing can be achieved by associating one or more independent Kalman filters with each pixel position.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for visual background subtraction with one or more preprocessing modules. An input video stream is passed through one or more switchable, reconfigurable image correction units before being sent on to a background subtraction module or another visual analysis system. Depending on the environmental conditions, one or more modules can be selectively switched on or off for various camera feeds. For instance, an indoor camera generally does not require wind correction. In addition, for a single camera, various preprocessors might only be invoked at certain times. For example, at night, the color response of most cameras is poor in which case they revert to essentially monochrome images. Thus, during the day, the signal from this camera might be processed to ameliorate the effect of chroma filtering (e.g., moving rainbow stripes at sharp edges) yet this module could be disabled at night.

The present invention copes with each of the problems identified above through the addition of software preprocessing modules that are easy to install and have small incremental costs (no new hardware is involved). This architecture allows the use of a straightforward technique of background subtraction, in conjunction with small, efficient preprocessing engines crafted for known shortcomings, rather than requiring the use of more elaborate (and often slower) general-purpose techniques like optical flow analysis. The present invention recognizes that even if a more sophisticated object detection technology is used to account for residual anomalies, algorithmically correcting the degradation processes which are understood and known to occur typically reduces the burden on the scene modeling component and can improve the overall system response time.

Figure 1:
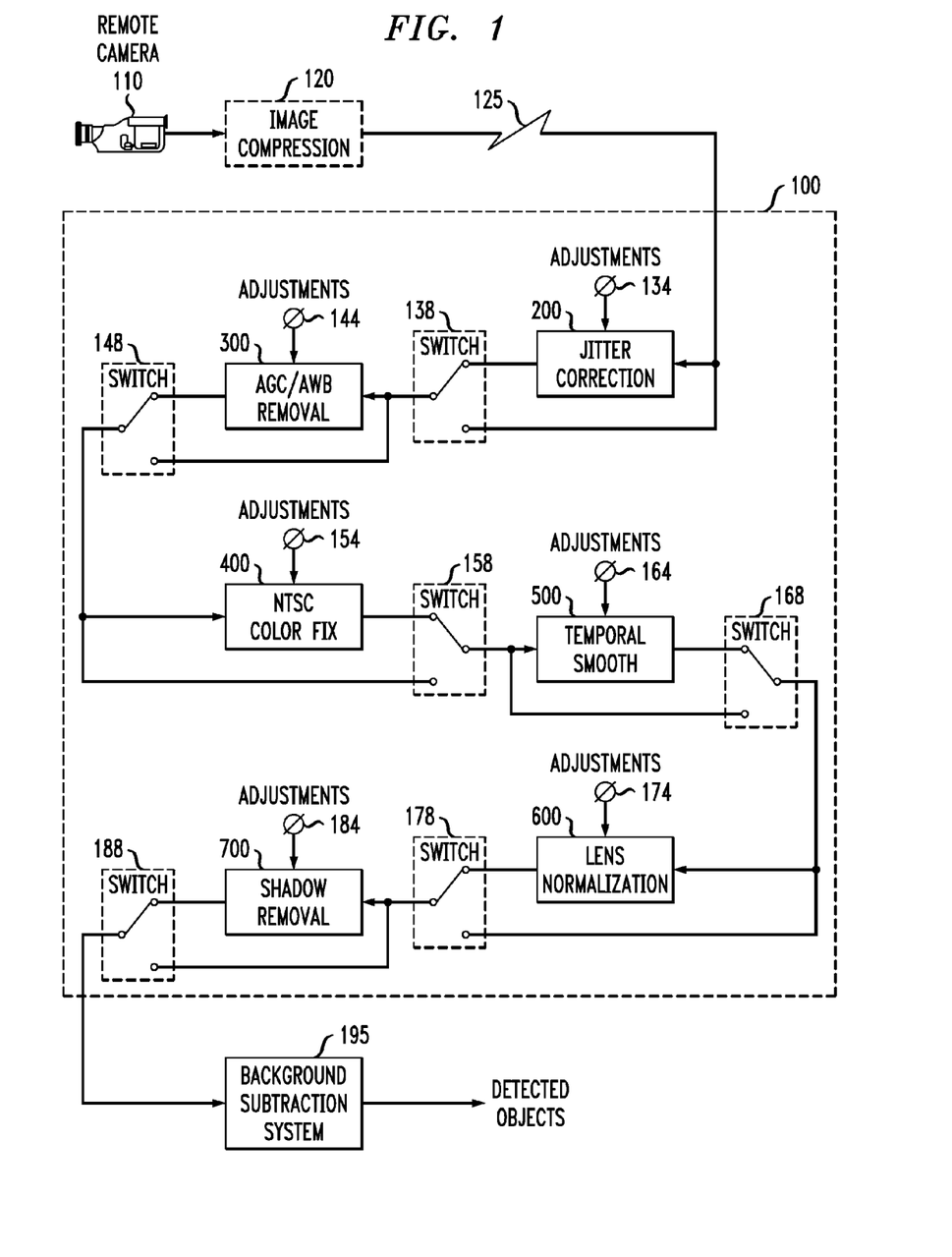
FIG. 1 is a schematic block diagram of an image correction system incorporating features of the present invention.

FIG. 1 is a schematic block diagram of an image correction system 100 incorporating features of the present invention. As discussed further below, the image correction system 100 performs visual background subtraction at stage 195, for example, to detect one or more objects in an image, and employs one or more preprocessing modules 200, 300, 400, 500, 600, 700, each discussed below in conjunction with FIGS. 2 through 7, respectively. The processed image may be obtained, for example, from a remote camera 110, and the images generally have undergone an image compression 120. The compressed image may be received, for example, over a transmission medium or channel 125, such as a wired or wireless link.

As shown in FIG. 1, the settings of each of the preprocessing modules 200, 300, 400, 500, 600, 700 may optionally be adjusted by an associated adjustment tap 134, 144, 154, 164, 174, for example, to configure each preprocessor 200, 300, 400, 500, 600, 700 with a custom set of parameters. In addition, in one implementation, each of the preprocessing modules 200, 300, 400, 00, 600, 700 may be selectively included or excluded from the image processing path by an associated switch 138, 148, 158, 168, 178. The parameters and switch settings can be different for different camera channels, and can vary over time in some scheduled or other requested manner.

It is noted an image signal received by the image correction system 100 may have undergone previous corruption by one or mole effects. The image correction system 100 can optionally initially detect the one or more effects in the received image signal. This might be done, for example, by having a human evaluate the image. In another variation, each preprocessor 200, 300, 400, 500, 600, 700 can be applied to the image to see if one or more of the preprocessors 200, 300, 400, 500, 600, 700 reduces the number of objects detected by the final background subtraction system 195. Since these are presumably false positives, such reductions indicate that the associated preprocessor should be enabled. Of course, the system could also use explicit detectors for the one or more effects. Such detectors are inherent in many of the correction blocks, i.e., if the relevant effect is absent, no correction is applied, as would be apparent to a person of ordinary skill in the art.

Stabilization Method

Figure 2:
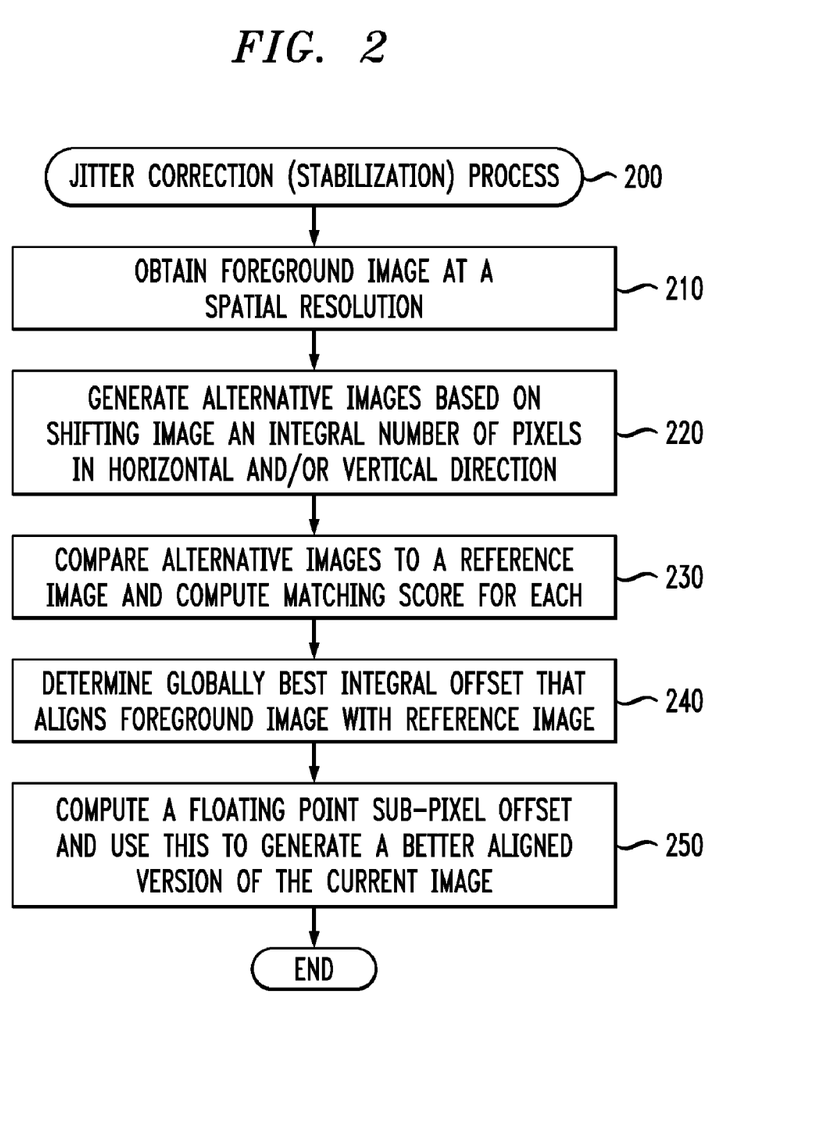
FIG. 2 is a flow chart describing an exemplary implementation of a jitter correction (stabilization) method that may be employed by the jitter correction preprocessor of FIG. 1.

FIG. 2 is a flow chart describing an exemplary implementation of a jitter correction (stabilization) method 200 that may be employed by the jitter correction preprocessor 200 of FIG. 1. Generally, the proposed image stabilization subsystem 200 takes the foreground image at some spatial resolution and generates a number of alternative images based on shifting the image an integral number of pixels in the horizontal and/or vertical direction. These alternative images are compared to the reference image and a matching score is computed for each. Based on this set of scores, a best guess at a floating point sub-pixel offset is determined that aligns the current image with the reference image. This offset may be applied to normalize the current image (by shifting and interpolation) at the analyzed resolution, or at either higher or lower spatial resolutions by appropriate linear scaling of the offset parameters.

The illustrative embodiment of the stabilization subsystem 200 is strictly software, so it can be employed in legacy cameras and does not require the installation of new or bulkier hardware. The stabilization subsystem 200 is more efficient than optical flow methods, especially since the image can be analyzed at a lower resolution than standard, and thus requires less computational resources. Finally, the stabilization subsystem 200 generates sub-pixel estimates that permit the degree of correction required by the background subtraction algorithm.

Each incoming video frame is shifted in various ways and then compared to a stored reference image. In one preferred embodiment, the image is converted to monochrome by averaging the red, green, and blue channels (as is the reference image). Images are analyzed at their standard resolution, but the comparisons are only made at a selection of sample sites, typically evenly spaced to yield several thousand sites (e.g., a sampling unit of every 4th pixel in the horizontal and vertical direction). This allows fine scale detail to be used in the estimation procedure, but significantly reduces the computational demand. Also, because in many situations there is more pan than tilt, a cross-shaped search pattern is employed (rather than a full, and slower, search of all offsets within a set of ranges).

As shown in FIG. 1, a foreground image at a given spatial resolution is obtained during step 210. Thereafter, the jitter correction method 200 generates a plurality of alternative images during step 220, based on shifting the image an integral number of pixels in the horizontal and/or vertical direction. The alternative images are compared to a reference image during step 230, and a matching score is computed for each alternative image.

During step 240, a globally best integral offset is determined that aligns the foreground image with the reference image. Finally, a floating point sub-pixel offset is computed during step 250 that is used to generate a better aligned version of the current image.

In one exemplary implementation, a series of horizontal shifts in an exemplary range of +/−4 pixels (including zero) is performed and each resulting variation compared with the reference image (at the same resolution and in monochrome). The comparison metric is the average absolute difference between corresponding selected pixel sites. The shift with the best score (least difference) is chosen and the scores of adjacent shifts (+/−1 pixel) are graphed and fit with a parabola. The lowest point on this parabola is then taken as the floating point sub-pixel horizontal shift. After this, the image is shifted by the best integer horizontal shift, as determined above, and then subjected to a series of additional vertical shifts in a range of typically +/−2 pixels (including the zero case, that was already scored). As before, the mean absolute difference between each variation and the reference image is computed, the best integer shift is selected, and a floating point sub-pixel vertical estimate is formed by a parabolic fit of adjacent scores. If an estimated shift is close to the bounds of the search ranges, it is declared invalid and a shift of (0.0, 0.0) is reported instead.

Because the jitter correction method 200 was intended for use in conjunction with a background subtraction system 195, it is easy to obtain a mask designating where (in the previous frame) foreground objects were detected relative to the stored background image. Sampled pixels that fall under this mask are omitted from the mean absolute difference calculation. This keeps the estimator from attempting to track large foreground objects (presuming they ate detected) instead of the background as intended.

If a valid, significantly small shift is estimated (typically less than $1/10$ pixel) and it has been a long time since the reference image was initialized (typically 100 frames), then the background reference image is updated by simply copying the current frame. If the current image is known to be an invalid background model in certain regions due to the presence of foreground objects, a separate background validity image is also stored corresponding to the current mask. The system 200 then ignores pixel samples that fall under either this mask, or the newly supplied mask for each input frame, as explained above.

The final stabilized image is generated by bi-linear interpolation of the original image at the best estimated offset.

Since the input and output images are the same size, the mixing coefficients to generate each pixel from its four, nearest neighbors are always the same. Moreover, since there are only a discrete number of possibilities for intensity (0 to 255), it is possible to pre-compute four tables that yield the appropriate scaled responses for each of the four neighbors. To convert the image, an integer pixel offset can be added to the read pointer and then the values of four neighbors are used as indices to the pre-computed tables and the lookup values summed to produce the desired output pixel value. The same procedure and tables can be used for each of the red, green, and blue channels in a color image.

Color Correction Method

Figure 3:
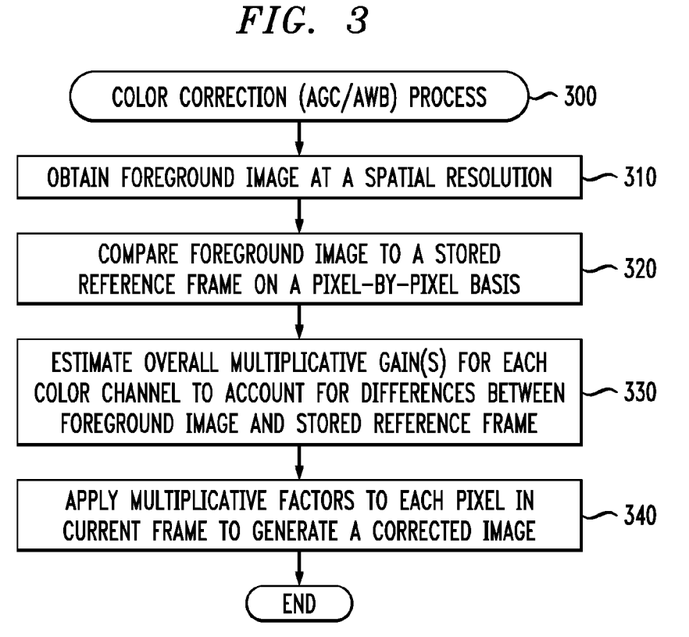
FIG. 3 is a flow chart describing an exemplary implementation of a color correction method that may be employed by the color correction preprocessor of FIG. 1.

FIG. 3 is a flow chart describing an exemplary implementation of a color correction method 300 that may be employed by the color correction preprocessor 300 of FIG. 1. Generally, the image correction subsystem 300 operates by estimating a multiplicative channel gain(s) to account for differences between the current video frame (image) and a stored reference frame (image). For a monochrome source, one gain value is estimated. For a color video, typically three channel gains (red, green, and blue) are estimated or, alternatively, one overall gain (as for monochrome) and three differential channel gains (for RGB). These multiplicative factors are then applied to each pixel in the current frame to generate an image more similar in overall appearance to the stored reference frame.

As shown in FIG. 3, a foreground image is initially obtained at a spatial resolution during step 310. The foreground image is then compared to a stored reference frame on a pixel-by-pixel basis during step 320. The overall multiplicative gain(s) for each color channel are estimated during step 330 to account for differences between the foreground image and the stored reference frame. Finally, the multiplicative factors are applied to each pixel in the current frame during step 340 to generate a corrected image.

In one embodiment, the global gain estimates are computed using histograms of the individual gain estimates derived for each pixel position. The peak (mode) of the smoothed histogram is chosen as the optimal correction factor thereby making the system robust to moderate scene changes (which give rise to secondary peaks without moving the primary peak). In an alternative histogram stretching method, the introduction of such a disturbance would lead to an inappropriate stretching of the normalization transfer function over the color region related to the scene change.

In an exemplary implementation, there is a stored reference image B(x, y) and the current image V(x, y). Conceptually, for each pixel position (x, y) a factor $f(x, y) = B(x, y)/V(x, y)$ is computed. These individual estimates are collected into a histogram H(f) over a range of possible correction values, where H(f) may be optionally smoothed by an operation such as averaging of adjacent bins. Finally, the index f of the bin in H(f) with the maximum value is selected as the best gain correction factor A new image $V'(x, y) = f*V(x, y)$ is then generated as a result of the process.

In one preferred embodiment of the color correction system 300, for reasons of speed, only some fraction of the pixels in B and V are examined. Typically, several thousand pixel sites (randomly or systematically distributed) are sufficient to generate a valid gain estimate for images of arbitrarily large sizes. Also, in the preferred embodiment the gain estimates f(t) are smoothed over time with something like a recursive filter, $f'(t) = a*f(t) + (1-a)*f'(t)$, to account for the slowly varying nature of typical AGC/AWB circuitry. It is this smoothed value, f'(t), that is used to correct the pixel intensities.

Estimates from some of the selected pixel sites can optionally be disregarded. Since the correction method is used in conjunction with a background subtraction object finding system, any pixels corresponding to known foreground objects (as determined from the previous frame) are omitted from the histogram. Similarly, pixels with intensities that are either very high (e.g., saturated) or low (e.g., nearly black) are omitted because these estimates tend to be noisier than others. If too few pixels remain (in any one of the channels), the overall gain estimate calculations are terminated and the gain factor most recently derived is re-used.

For color images, three separate channel gains r"(t), g"(t), b"(t) are generated and maintained in the exemplary color correction method 300 described above. However, they are reported as an overall gain y(t) and differential gains dr(t), dg(t), db(t). The overall gain y(t) is derived by taking the average of the three channel gains, and then clipping the value to a known valid range of gains. The individual channel differential gains are then computed relative to this overall gain (e.g., $dr(t) = r"(t)/y(t)$) and similarly clipped to a different known valid range of values. This prevents unreasonable compensation parameters from being used in the correction phase (i.e., $Vr'(x, y, t) = y(t) * dr(t) * V(x, y, t)$).

For use with background subtraction, the gains are also used to alter a reference background image which will be compared with the newly corrected video frame. In this operation, the value of a pixel in some channel is limited to be less than or equal to 255 (the maximum pixel value) times the gain for that channel. The rationale for this is that, for a gain <1.0, this value is the largest value that could be generated for that color channel in the newly corrected frame. This prevents the system from flagging differences at pixels that are bright in the current image but which could not be properly down corrected (since their true value was unknown).

NTSC Artifact Reduction Method

Figure 4:
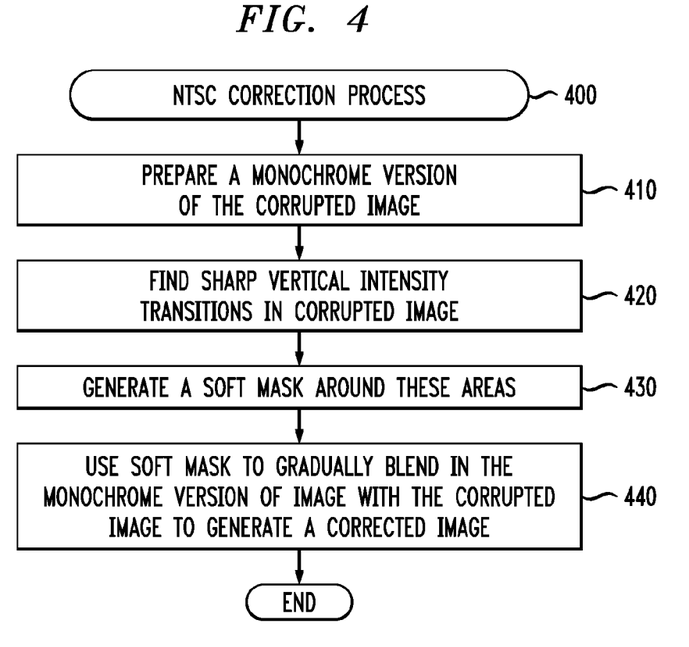
FIG. 4 is a flow chart describing an exemplary implementation of an NTSC correction process that may be employed by the NTSC color correction preprocessor of FIG. 1.

FIG. 4 is a flow chart describing an exemplary implementation of an NTSC correction process 400 that may be employed by the NTSC color correction preprocessor 400 of FIG. 1. Generally, the NTSC correction subsystem 400 suppresses color information around problematic edges. The NTSC correction subsystem 400 initially directly finds sharp vertical transitions in the corrupted image, then generates a soft mask around these areas that is used to gradually blend in a monochrome version of the image. This method 400 allows color information to be retained for the bulk of the image while simultaneously minimizing the effect of rainbow artifacts. As no spatially averaging is involved, the resulting image retains the full resolution of the original. Moreover, the method works equally well on native or compressed video streams.

As shown in FIG. 4, the NTSC correction process 400 initially prepares a monochrome version of the corrupted image during step 410. Thereafter, sharp vertical intensity transitions are identified in the corrupted image during step 420. A soft mask is generated around these areas during step 430, and then the soft mask is used during step 440 to gradually blend in the monochrome version of image with the corrupted image to generate a corrected image.

In one preferred embodiment, step 410 is performed by averaging the red, green, and blue color channels at each pixel. Step 420 can be done by applying horizontal and vertical Sobel masks and analyzing the convolution responses. Various edge pixels are then selected based on their directions to form an intermediate mask image. In one preferred embodiment, edge pixels with orientations of +45 to +135 degrees or +225 to +315 degrees have their magnitudes multiplied by a factor of 10 and gated to the intermediate image (so a true edge magnitude of 25.5 or higher will yield a fully white, 255, mask pixel). All other pixels are set to zero.

The intermediate mask image is then processed by a local averaging operator (essentially a convolution with a uniform-value rectangular block mask). This spreads the influence of the detected edge to adjacent pixels and also "feathers" the edges of the mask. In one preferred embodiment, the local averaging occurs over a 5×3 pixel area centered on the original pixel and multiplies the resulting value by a factor of 3.

In the final step 440, the blurred mask (M) is used to mix together pixels of the original image (I) with pixels from a monochrome version (G) of the image. This monochrome image can be the same as the one used for edge finding, but conceptually it could be formed by some different process (e.g., an unevenly weighted combination of red, green, and blue values).

$$I'c(x, y) = [1-(M(x, y)/255)]*Ic(x, y)+[M(x, y)/255]*G(x, y)$$

This is the final output (I') of the process 400, where c is a color channel, such as the red component of some pixel.

Temporal Smoothing Method

Figure 5:
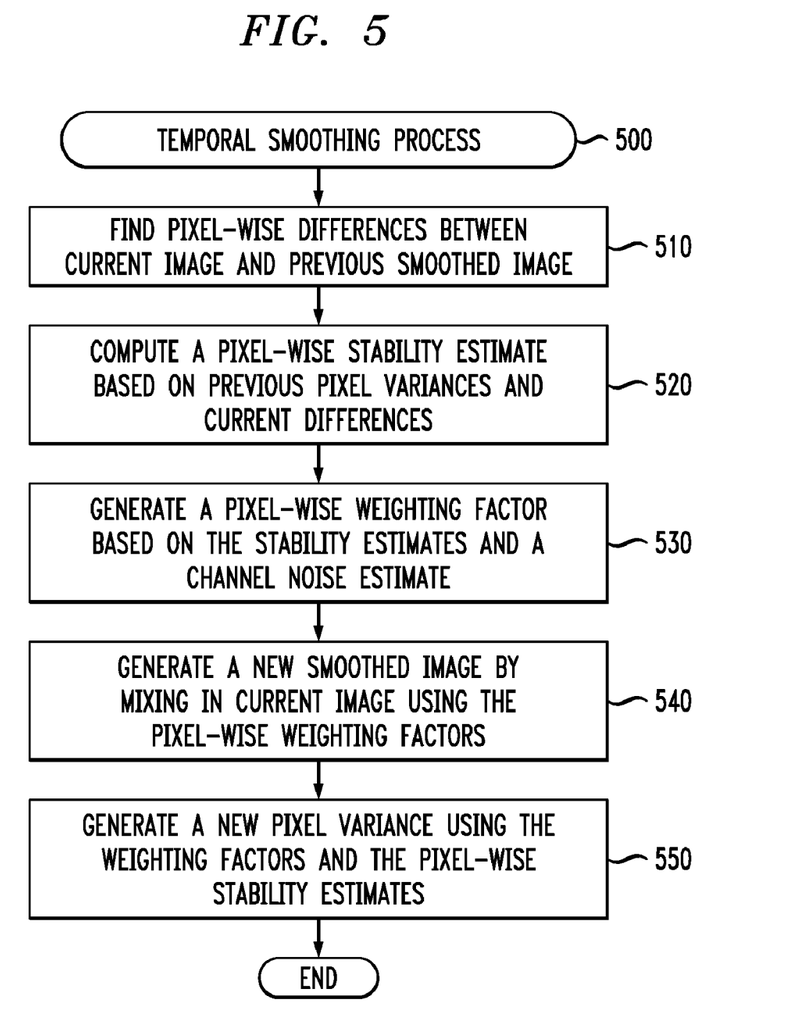
FIG. 5 is a flow chart describing an exemplary implementation of a temporal smoothing process that may be employed by the temporal smoothing preprocessor of FIG. 1.

FIG. 5 is a flow chart describing an exemplary implementation of a temporal smoothing process 500 that may be employed by the temporal smoothing preprocessor 500 of FIG. 1. Generally, the temporal smoothing subsystem 500 attempts to preserve all the spatial detail in an image while suppressing time-varying noise. The basic structure of the processing engine is a set of independent Kalman filters, conceptually one at each pixel position. New values of intensity at a pixel are mixed in with the previous time-average using a weighting determined by the relative stability of the observed value versus the stability of the time-average. However, instead of just assuming a fixed noise figure for each observation and a monotonically decreasing noise figure for the average, the noise figure for the average is directly tweaked on each cycle in the exemplary embodiment based on the current observation.

According to one aspect of the invention, the disclosed temporal smoothing process 500 applies temporal smoothing to all pixels in an image, but the amount of smoothing depends on how much change has been observed at that pixel. In areas where motion is detected, the temporal smoothing is basically turned off, yet it is reapplied once the region settles down. While this does not suppress noise to the same extent as straight temporal averaging would, it is much more responsive to moving objects. Moreover, the degree of motion responsiveness is smoothly controlled by a continuous variable rather than having the system make firm decisions on motion or no-motion. This preserves object boundaries better (especially where they are somewhat indistinct) and acts to conceal any slight mistakes the system might make in its classification.

As shown in FIG. 5, the temporal smoothing process 500 initially finds pixel-wise differences between the current image and the previous smoothed image during step 510. Thereafter, during step 520, the temporal smoothing process 500 computes a pixel-wise stability estimate based on previous pixel variances and current differences.

A pixel-wise weighting factor is generated during step 530 based on the stability estimates and a channel noise estimate. A new smoothed image is generated during step 540 by mixing in the current image using the pixel-wise weighting factors Finally, a new pixel variance is generated during step 550 using the weighting factors and the pixel-wise stability estimates.

A Kalman filter can be described with two equations: one for the measurement (M) and one for the process (P).

$$\text{measurement: } M = P + Vm,$$

where Vm equals the variance in the measurement $$\text{process: } P' = b*P + c,$$

where c is the expected jumpiness and b is a time decay constant.

These equations can be used by the temporal smoothing process 500 to generate the standard Kalman update equations. The mixing of the new observation (M) with the previous average (P) during step 540 is determined by the Kalman matrix (here, just the value k). After absorbing the new measurement, the system 500 retains the new estimates of the average (P') and the variance (V') for use on the next cycle.

$$d = M - P,$$

where M equals the current image.

$$k = V/(V+n),$$

where n equals the measurement noise constant $$P' + k*d,.$$

where P' equals the new average.

$$V' = V - k*V$$

where V' equals the new variance.

In an exemplary embodiment, instead of using just the computed variance of the estimate to construct the Kalman mixing factor, a dynamic bias term is also included that is a real-time, one sample estimate of the variance at the pixel:

$$d = M - P,$$

where M equals the current image.

$$s = V - f*(d*d - V),$$

where f equals the mixing constant.

$$k = s/(s+n),$$

where n equals the measurement noise constant.

$$P' = P + k*d,$$

where P' equals the new average.

$$V' = s - k*s$$

where V'' equals the new variance.

Note that $d*d = (M-P)^2$ equals the square of the difference between the current observation and the longer term average. It is this new "s" term that causes the temporal averaging to be turned off when objects move. If the pixel is much different from what is expected, s goes up which in turn raises k, the proportion by which the new measurement is blended with the longer term average.

In one preferred embodiment for video at 30 frames per second and for pixel intensities in the range of 0 to 255, f equals 0.1 and n equals 64. Also, for color images, separate versions of the estimator are run for the red, green, and blue values at each pixel. The "clean" image is generated by reporting the averages (P') for each estimator in place of the original observed intensities (M).

Lens Normalization

Figure 6:
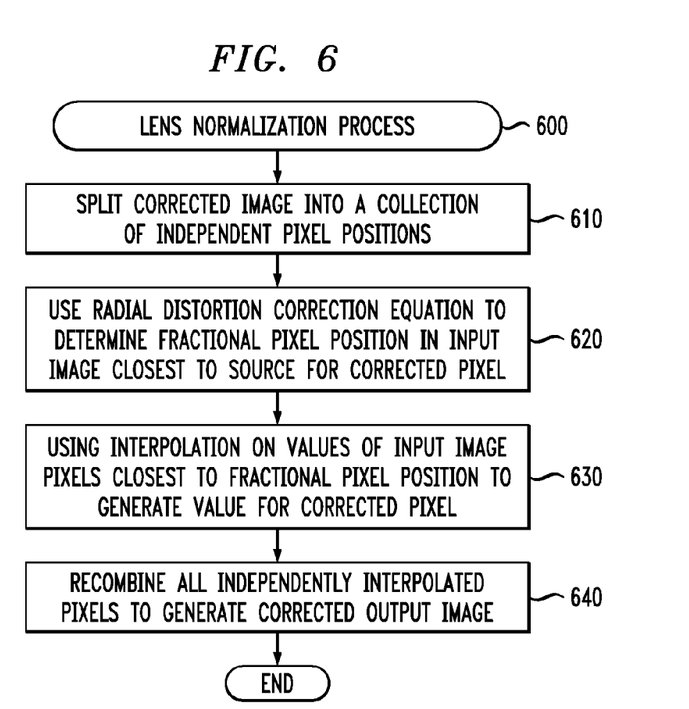
FIG. 6 is a flow chart describing an exemplary implementation of a lens normalization process that may be employed by the lens normalization preprocessor of FIG. 1.

FIG. 6 is a flow chart describing an exemplary implementation of a lens normalization process 600 that may be employed by the lens normalization preprocessor 600 of FIG. 1. As shown in FIG. 6, the corrected image is split into a collection of independent pixel positions during step 610. Thereafter, a radial distortion correction equation is used to determine the fractional pixel position in the input image closest to the source for the corrected pixel during step 620.

Standard radial lens distortion correction can be accomplished by applying the following equations:

$$x' = x + sc2*r^2 + sc4*r^4;  \text{ and}$$

$$y' = y + sc2*r^2 + sc4*r^4$$

where (x', y') is the new corrected position for a pixel, (x, y) is the original pixel location in the distorted image, r is the distance of the original pixel from the projection (x0, y0) of the optical lens center on the image plane, and sc2 and sc4 are fixed constants describing the curvature of the lens.

Interpolation is employed on values of the input image pixels closest to the fractional pixel position to generate a value for the corrected pixel during step 630 Finally, all independently interpolated pixels are recombined during step 640 to generate a corrected output image.

Shadow Removal Method

Figure 7:
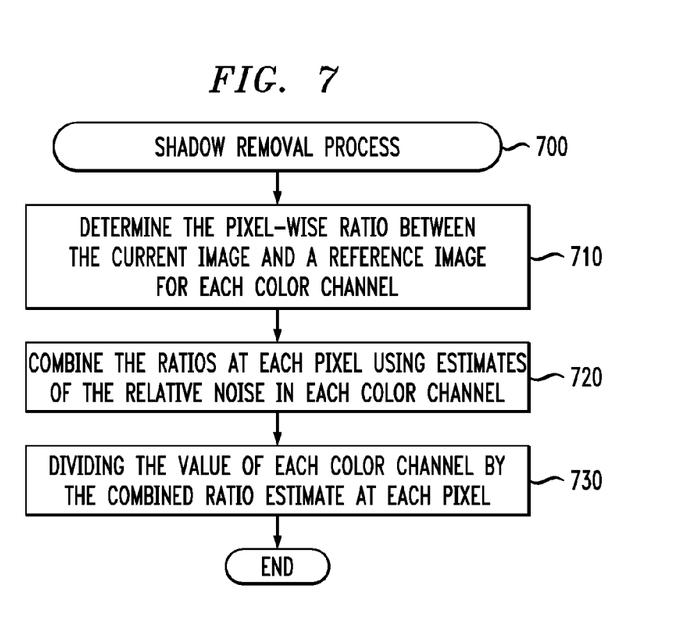
FIG. 7 is a flow chart describing an exemplary implementation of a shadow removal process 700 that may be employed by the shadow removal preprocessor 600 of FIG. 1.

FIG. 7 is a flow chart describing an exemplary implementation of a shadow removal process 700 that may be employed by the shadow removal preprocessor 700 of FIG. 1. Generally, the shadow removal subsystem 700 pre-corrects the input image for possible shadow effects before passing the corrected image on to a standard background subtraction algorithm. The pre-correction involves adjusting the intensity of each pixel based on a gain factor computed from channel intensity ratios that have been weighted by channel noise estimates. In regions where there is little difference between the original input and the reference, the gain estimate will be close to one and hence there will continue to be little difference. In regions where there are significant differences (particularly in color), correcting the average intensity of a pixel will not generally make its color components match any better and hence there will still be a difference. It is only where absolute intensity collection is appropriate (namely, shadows and highlights) that pixels will have their determination changed (i.e, from being a difference, to not being a difference).

The disclosed shadow removal process 700 has a number of advantages. The shadow removal process 700 does not require expensive trigonometric calculations (and hence can be faster), will work in dim and bland regions (since it remains in the RGB color space), and will not be thrown off significantly by noisy images or video compression artifacts (e.g. a bad blue channel).

As shown in FIG. 7, a pixel-wise ratio between the current image and a reference image is determined for each color channel during step 710. The ratios are then combined during step 720 at each pixel using estimates of the relative noise in each color channel. The shadow removal process 700 then divides the value of each color channel by the combined ratio estimate at each pixel during step 730.

In one exemplary embodiment of the shadow removal process 700, for each pixel in the input image, its red, green, and blue color values are compared to those for the corresponding pixel in the reference image. Separate ratios are computed for each channel:

$$F_r = S_r/I_r, F_g = S_g/I_g, F_b = S_b/I_b$$

Here, $F_c$ is the gain correction factor estimate for channel c (either r=red, g=green, or b=blue), $S_c$ is the value of channel c for the pixel in the stable reference image, and $I_c$ is the value of the pixel in channel c for the input image. The three separate estimates are then each compared to a potential valid range of correction, such as 2.0× to 0.8×. If any individual estimate is outside these bounds, the gain for the pixel is set to one (and so no change is made). Otherwise, the individual estimates are combined based on the noise in each channel:

$$F = F_r/W_r + F_g/W_g + F_b/W_b,$$

where $W_c = N_c*(1/N_r + 1/N_g + 1/N_b)$, $N_c$ being the observed noise in channel c. Once F(x, y) has been calculated for each pixel, a corrected image is produced by multiplying through by the derived factors:

$$I'(x, y) = F(x, y)*I(x, y).$$

In one preferred embodiment, the noise estimates are computed by comparing each input image with a reference image. Typically, the original image is heavily subsampled (e.g., every 4th pixel in the vertical and horizontal directions) to select only several thousand pixels for evaluation. Also, since this module 700 is typically used in conjunction with a background subtraction system 195, pixels that are known not to correspond to the background (i.e., pixels that are part of detected foreground objects) are omitted from the comparison. The absolute value of each selected pixel difference ($|I_c(x, y) - S_c(x, y)|$ in a channel c) is then accumulated into a difference histogram for that channel.

The difference histogram itself is smoothed, using a method such as the averaging of adjacent bins, and the primary peak (maximum occupancy bin) is found. The falling edge of this peak is determined by locating the lowest index bin whose occupancy is less than some factor (e.g., 10%) of the peak value. The value (n) associated with this bin is a new estimate of the noise in the channel. This new value can either be reported directly or, in the preferred implementation, combined with the previous noise estimate using a temporal smoothing filter (e.g., $N'_c = (1-k)*N_c + k*n$ with k equal to 0.05 for 30 frames per second video).

In a further variation, one or more of the preprocessing blocks in the system 100 can perform a contrast enhancement on the image signal. Contrast enhancement can be implemented, for example, by determining what part of the dynamic range of pixel values is being used. In one implementation, a histogram is created of all the red, green, and blue pixel values and then the 5% percentile point and the 95% percentile point of the distribution are identified. From these numbers, an offset and scale factor are calculated that will translate these points to fixed values such as 20 and 240, respectively. This effectively stretches the range of values being used without altering the hue information (which is based on color differences, not ratios).

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computers to lead instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for processing an image signal, comprising:
   receiving an image signal that has been corrupted by one or more effects;
   detecting said one or more effects in said received image signal;
   selectively enabling one or more blocks to preprocess said image signal to compensate for said detected one or more effects, wherein said selective enabling is based on said detected one or more effects; and
   performing visual analysis on said preprocessed signal using background subtraction, wherein said visual analysis is performed by a processor.

2. The method of claim 1, wherein said visual analysis identifies one or more objects in said preprocessed image signal.

3. The method of claim 1, wherein said one or more blocks performs a jitter correction on said image signal.

4. The method of claim 1, wherein said one or more blocks performs a color correction on said image signal.

5. The method of claim 1, wherein said one or more blocks performs a contrast enhancement on said image signal.

6. The method of claim 1, wherein said one or more blocks performs a cable-induced visual artifact reduction on said image signal.

7. The method of claim 1, wherein said one or more blocks performs a spatially-variant temporal smoothing on said image signal.

8. The method of claim 1, wherein said one or more blocks performs a lens geometry normalization on said image signal.

9. A system for processing an image signal, comprising:
   a memory; and
   at least one processor, coupled to the memory, operative to:
   receive an image signal that has been corrupted by one or more effects;
   detect said one or more effects in said received image signal;
   selectively enable one or more blocks to preprocess said image signal to compensate for said detected one or more effects, wherein said selective enabling is based on said detected one or more effects; and
   perform visual analysis on said preprocessed signal using background subtraction.

10. The system of claim 9, wherein said visual analysis identifies one or more objects in said preprocessed image signal.

11. The system of claim 9, wherein said one or more blocks performs a jitter correction on said image signal.

12. The system of claim 9, wherein said one or more blocks performs a color correction on said image signal.

13. The system of claim 9, wherein said one or more blocks performs a contrast enhancement on said image signal.

14. The system of claim 9, wherein said one or more blocks performs a cable-induced visual artifact reduction on said image signal.

15. The system of claim 9, wherein said one or more blocks performs a spatially-variant temporal smoothing on said image signal.

16. The system of claim 9, wherein said one or more blocks performs a lens geometry normalization on said image signal.

17. An article of manufacture for processing an image signal, comprising a non-transitory machine readable storage medium containing one or more programs which when executed implement the steps of:
   receiving an image signal that has been corrupted by one or more effects;
   detecting said one or more effects in said received image signal;
   selectively enabling one or more blocks to preprocess said image signal to compensate for said detected one or more effects, wherein said selective enabling is based on said detected one or more effects; and
   performing visual analysis on said preprocessed signal using background subtraction.

18. The article of manufacture of claim 17, wherein said one or more blocks performs one or more of a jitter correction on said image signal, a color correction on said image signal, a contrast enhancement on said image signal, a cable-induced visual artifact reduction on said image signal, a spatially-variant temporal smoothing on said image signal, or a lens geometry normalization on said image signal.

19. A method for processing an image signal, comprising:
   receiving an image signal that has been corrupted by one or more effects;
   selectively enabling one or more blocks to preprocess said image signal to compensate for said one or more effects, wherein said selective enabling is based on said detected one or more effects;
   performing spatially-variant temporal smoothing to further preprocess said image signal; and
   presenting said preprocessed image signal for visual analysis, wherein said visual analysis is performed by a processor.

20. The method of claim 19, wherein said visual analysis identifies one or more objects in said preprocessed image signal.

21. The method of claim 19, wherein said visual analysis uses background subtraction.

22. The method of claim 19, wherein said visual analysis is performed by a human watching a video screen.

23. The method of claim 19, wherein said spatially-variant temporal smoothing is achieved by the mixing of a new intensity value with a previous intensity time-average as determined by a weighting matrix.

24. The method of claim 19, wherein said spatially-variant temporal smoothing is achieved by associating one or more independent Kalman filters with each pixel position.

* * * * *